(No Model.)
L. H. NASH.
BEARING PIN CONNECTING ROD.
No. 334,036. Patented Jan. 12, 1886.
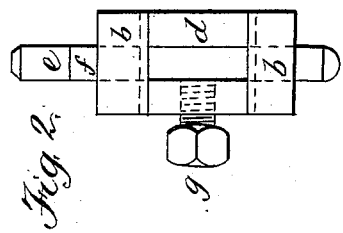
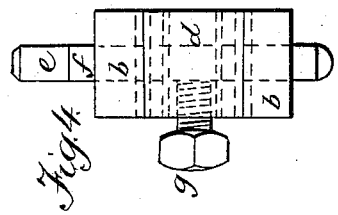
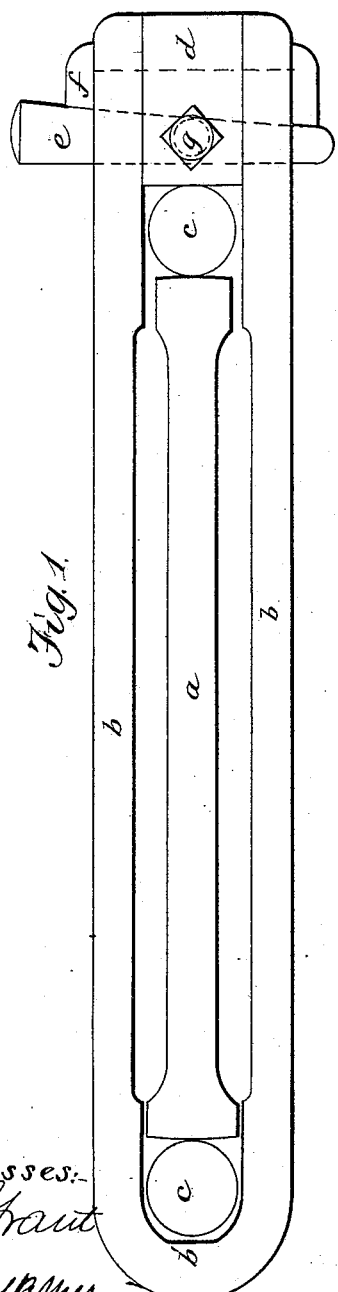
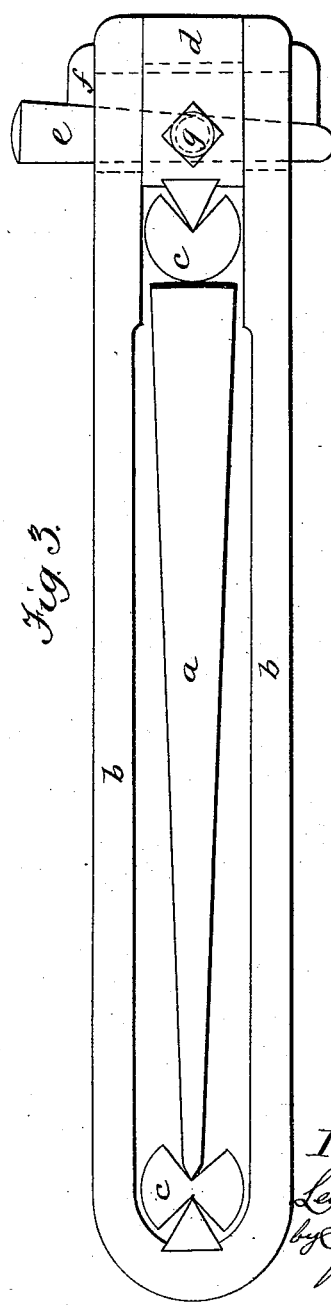
Witnesses:
Inventor:-
Lewis Hallock Nash,
by Johnson and Johnson
Attys

UNITED STATES PATENT OFFICE.

LEWIS HALLOCK NASH, OF BROOKLYN, ASSIGNOR TO THE NATIONAL METER COMPANY, OF NEW YORK, N. Y.

BEARING-PIN CONNECTING-ROD.

SPECIFICATION forming part of Letters Patent No. 334,036, dated January 12, 1886.

Application filed June 3, 1885. Serial No. 167,479. (No model.)

*To all whom it may concern:*

Be it known that I, LEWIS HALLOCK NASH, a citizen of the United States, residing at Brooklyn, in the county of Kings and State of New York, have invented new and useful Improvements in Bearing-Pin Connecting-Rods for Engines and other Machinery, of which the following is a specification.

My improvement is directed to a construction of connecting-rods in which a rocking or rolling motion of the rod upon its pins is substituted for the usual sliding motion of the bearing-box parts upon the pins, whereby lubrication is rendered unnecessary and the friction of the bearing-surfaces greatly reduced.

The drawings represent two connecting-rods having equivalent forms of abutting, rolling, or rocking pin-bearings, in which—

Figure 1 is a side view, and Fig. 2 is an end view of the same; and Figs. 3 and 4 are similar views of a connecting-rod having a modified form of pin-bearings.

The important feature of my invention is the provision by which the ends of the connecting-rod are made to bear directly upon the bearing-pins by points of contact instead of sliding over and upon the entire surfaces of the pins, as in the usual construction. The rod $a$ proper has abutting end bearings, and is inclosed by a strap, $b$, which also incloses the bearing-pins $c\,c$, one of which is encircled and held upon the rod by the strap, while the other pin is held upon the other end of said rod by an abutting block, $d$, secured to the ends of the strap upon the pin by a key, $e$, and gib $f$, which passes through corresponding slots in the strap and in the abutting block, and serves to drive and to keep the latter upon the bearing-pin. The rod is therefore clamped between and upon points of contact of bearing-pins within and between the strap. The bearing-pins do not quite fill the space between the strap-arms, and they bear upon points of contact on opposite sides in the line of the rod, and are permitted to roll back and forth within the strap upon such points of contact without slipping or sliding.

In Fig. 1 both ends of the rod are formed with a bearing-surface having an arc struck from the middle of the length of the rod, and both the pins are cylindrical, and the rolling surfaces being accurately formed the same distance between the centers of the bearing-pins will always be preserved within any required movement of the connecting-rod which may occur under the conditions of its use. In this movement of the connecting-rod it will rock upon the pins at both ends without sliding or slipping, there being sufficient space between the inner walls of the strap and the connecting-rod to permit of this side motion of the latter without being crowded.

In the construction in which cylindrical pins are used the bend of the strap has an interior flat bearing, $b'$, so that the pin at this end of the rod has flat points of contact upon the end of the rod and upon the inner wall of the strap, while the other pin has similar bearings between the rod and the abutting block, so that the four contact-points of bearing upon the pins are in the line of the rod. This is also true, and the function and action of the bearings are identical, in a construction in which the bearing points of contact are reduced to an edge-contact both on the bearing-pins and on the rod ends, as in Fig. 3. The edge-contact is made by V-shaped bearings, which, at the bend of the strap, are made by grooves formed in the opposite sides of the bearing-pin to receive the corresponding end of the rod and a corresponding bearing preferably set in projecting from the inner wall of the strap. At the keyed end of the strap the pin has a cylindrical bearing-point upon the end of the rod and an edge bearing upon the abutting block, so that in all movements of the connecting-rod its end points of contact will be maintained upon the cylindrical surface of the pin. A binding-screw, $g$, in the side of the abutting block secures the key when the bearing parts are properly set.

Connecting-rods having rolling point-bearings such as I have described do not require to be lubricated, and are especially important in their use in gas and other engines in which rock-shaft connecting-rods are used for operating the piston. As the strap incloses both bearing-pins, one key and gib are sufficient to secure the parts, and to take up the lost motion produced by wear at both bearing-pins, since the key forces the abutting block against its bearing-pin and draws the strap hard against the other bearing-pin, the rod abutting upon the two pins.

I claim—

1. The combination, in a connecting-rod having pin-bearings, of a rod and its bearing-pins having points of bearing contact at each end of the rod, adapted to rock or to roll upon each other, substantially as described, for the purpose specified.

2. In a connecting-rod having pin-bearings, the combination, with the rod and its pin-bearings having points of bearing contact at each end of the rod, adapted to roll or to rock upon each other, of a strap inclosing said bearing-pins and the rod having a contact bearing-point upon one of said pins, substantially as described, for the purpose specified.

3. The combination of a connecting-rod having abutting end bearings with the bearing-pins, a strap inclosing said bearing-pins, and the rod having a contact bearing-point upon one of said pins, and an abutting block having a contact bearing-point upon the other of said pins, and means for securing said strap to said abutting block and of adjusting the bearings upon the pins, substantially as described, for the purpose specified.

4. A connecting-rod having abutting point bearing ends, substantially flat, in combination with the bearing-pins, an abutting block having a flat bearing upon one of said pins, a strap having a flat bearing upon the other of said pins inclosing both pins, the abutting rod, and the abutting block, and a key and a gib for securing and adjusting the bearing parts, substantially as described, for the purpose specified.

In testimony whereof I have hereunto set my hand in the presence of two subscribing witnesses.

LEWIS HALLOCK NASH.

Witnesses:
H. W. BRINCKERHOFF,
WILLIAM C. WESTERVELT.